United States Patent
Takata et al.

(10) Patent No.: US 12,381,625 B2
(45) Date of Patent: Aug. 5, 2025

(54) FREE SPACE OPTICAL COMMUNICATION DEVICE, FREE SPACE OPTICAL COMMUNICATION SYSTEM, AND FREE SPACE OPTICAL COMMUNICATION METHOD

(71) Applicant: NEC Corporation, Tokyo (JP)

(72) Inventors: Koya Takata, Tokyo (JP); Atsushi Kamoi, Tokyo (JP); Hisashi Mizumoto, Tokyo (JP); Masaki Aizono, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 18/206,850

(22) Filed: Jun. 7, 2023

(65) Prior Publication Data

US 2024/0097788 A1 Mar. 21, 2024

(30) Foreign Application Priority Data

Sep. 16, 2022 (JP) ................................ 2022-148226

(51) Int. Cl.
*H04B 10/00* (2013.01)
*H04B 10/077* (2013.01)
*H04B 10/112* (2013.01)
*H04J 14/00* (2006.01)

(52) U.S. Cl.
CPC ..... *H04B 10/1125* (2013.01); *H04B 10/0775* (2013.01)

(58) Field of Classification Search
CPC ... H04B 10/11; H04B 10/112; H04B 10/1123; H04B 10/1125; H04B 10/1127; H04B 10/114; H04B 10/1143; H04B 10/116; H04B 10/118
See application file for complete search history.

(56) References Cited

U.S. PATENT DOCUMENTS

2022/0014269 A1 * 1/2022 Hand ..................... H04B 10/40
2024/0014900 A1 * 1/2024 Wendt .................. H04B 10/116

FOREIGN PATENT DOCUMENTS

| JP | H05-160792 A | 6/1993 |
| JP | H06-303215 A | 10/1994 |
| JP | 2000-124860 A | 4/2000 |
| WO | 2017/169927 A1 | 10/2017 |

* cited by examiner

*Primary Examiner* — Daniel G Dobson
(74) *Attorney, Agent, or Firm* — Sughrue Mion, PLLC

(57) ABSTRACT

A free space optical communication device includes: a plurality of light transmitting/receiving sections; and at least one processor configured to execute: a communication control process of controlling communication which is to be carried out via the plurality of light transmitting/receiving sections, in the communication control process, the at least one processor (a) determining a required communication capacity for the communication and (b) controlling, on the basis of the required communication capacity, the number of light transmitting/receiving sections to be used for the communication.

9 Claims, 6 Drawing Sheets

FREE SPACE OPTICAL COMMUNICATION DEVICE, FREE SPACE OPTICAL COMMUNICATION SYSTEM, AND FREE SPACE OPTICAL COMMUNICATION METHOD

This Nonprovisional application claims priority under 35 U.S.C. § 119 on Patent Application No. 2022-148226 filed in Japan on Sep. 16, 2022, the entire contents of which are hereby incorporated by reference.

TECHNICAL FIELD

The present invention relates to a free space optical communication device, a free space optical communication system, and a free space optical communication method.

BACKGROUND ART

The free space optical communication technology includes a mode that realize spatial multiplex transmission with use of a plurality of beams. A known example thereof is a technique that uses a communication device having a plurality of transmitting/receiving units mounted thereon. Further, there have been developed communication devices and communication systems designed in various ways in order to reduce the circuit scale and the number of devices in a device that executes spatial multiplex transmission.

Patent Literature 1 discloses a technique, for a receiving device for free space optical communication, that changes control between (a) a case where the number of input signals is large relative to the number of digital signal processing means that removes distortion, etc. of a digital signal and (b) a case where the number of input signals is small relative to the number of digital signal processing means, thereby reducing the number of digital signal processing means.

CITATION LIST

Patent Literature

[Patent Literature 1]
International Publication No. WO 2017/169927

SUMMARY OF INVENTION

Technical Problem

A free space optical communication device including a plurality of transmitting/receiving units for carrying out spatial multiplex transmission involves a problem of increased power consumption.

An example aspect of the present invention was made in view of the above problem, and has an example object to provide a technique that can reduce power consumption in a free space optical communication device that carries out spatial multiplex transmission.

Solution to Problem

A free space optical communication device in accordance with an example aspect of the present invention includes: a plurality of light transmitting/receiving sections; and at least one processor configured to execute: a communication control process of controlling communication which is to be carried out via the plurality of light transmitting/receiving sections, in the communication control process, the at least one processor (a) determining a required communication capacity for the communication and (b) controlling, on a basis of the required communication capacity, the number of light transmitting/receiving sections to be used for the communication.

A free space optical communication system in accordance with an example aspect of the present invention includes: a plurality of free space optical communication devices; at least two or more of the plurality of free space optical communication devices each including: a plurality of light transmitting/receiving sections; and at least one processor configured to execute: a communication control process of controlling communication which is to be carried out via the plurality of light transmitting/receiving sections, in the communication control process, the at least one processor (a) determining a required communication capacity for the communication and (b) controlling, on a basis of the required communication capacity, the number of light transmitting/receiving sections to be used for the communication.

A free space optical communication method in accordance with an example aspect of the present invention includes: controlling communication which is to be carried out via a plurality of light transmitting/receiving sections, the controlling the communication including: determining a required communication capacity for the communication; and controlling, on a basis of the required communication capacity, the number of light transmitting/receiving sections to be used for the communication.

Advantageous Effects of Invention

In accordance with an example aspect of the present invention, it is possible to provide a free space optical communication device, a free space optical communication system, and a free space optical communication method each of which can save power consumption.

DESCRIPTION OF EMBODIMENTS

First Example Embodiment

The following description will discuss a first example embodiment of the present invention in detail with reference to the drawings. The present example embodiment is a basic form of example embodiments described later.

(Configuration of Free Space Optical Communication System)

Figure 1:
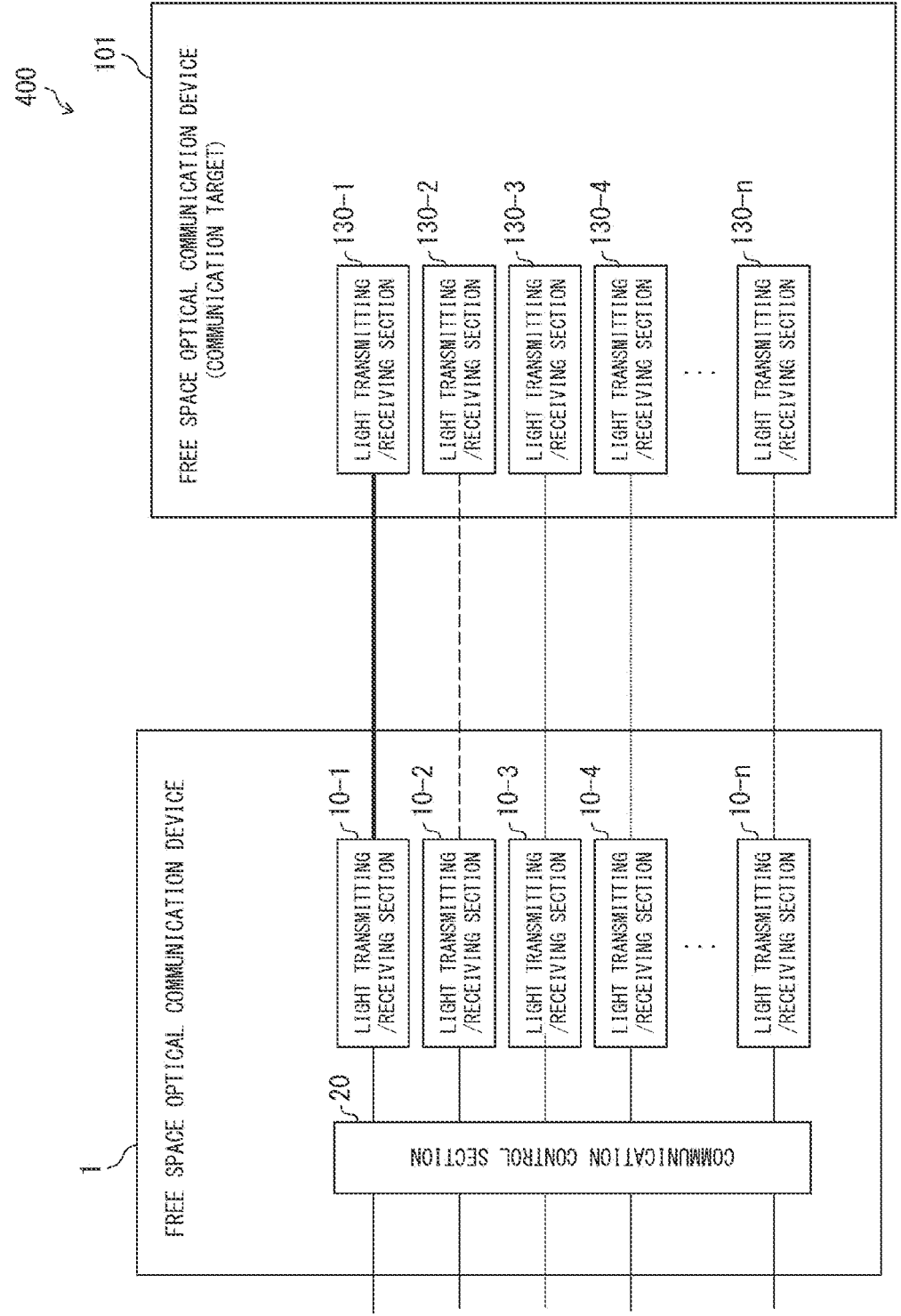
FIG. 1 is a block diagram illustrating a configuration of a free space optical communication system including a free space optical communication device in accordance with a first example embodiment of the present invention.

The following will describe, with reference to FIG. 1, a configuration of a free space optical communication system including a free space optical communication device in accordance with the present example embodiment. FIG. 1 is a block diagram illustrating a configuration of a free space optical communication system 400. The free space optical communication system 400 includes a plurality of free space optical communication devices 1 and 101, and realizes spatial multiplex transmission through simultaneous connection of a plurality of beams. FIG. 1 shows an example including two free space optical communication devices 1 and 101. However, the number of free space optical communication devices is not limited to this. In the description below, the one free space optical communication device 1 will be mainly discussed, and the other free space optical communication device 101 will be discussed as a communication target of the free space optical communication device 1. However, the free space optical communication devices 1 and 101 can be configured identically.

(Configuration of Free Space Optical Communication Device)

As shown in FIG. 1, the free space optical communication device 1 in accordance with the present example embodiment includes a plurality of light transmitting/receiving sections 10-1 to 10-$n$ and a communication control section 20. Each of the plurality of light transmitting/receiving sections 10-1 to 10-$n$ is one implementation example of a light transmitting/receiving section recited in the claims, and the communication control section 20 is one implementation example of at least one processor recited in the claims.

(Light Transmitting/Receiving Sections 10-1 to 10-$n$)

Each of the plurality of light transmitting/receiving sections 10-1 to 10-$n$ is configured to be capable of transmitting an optical communication medium (light transmission) and of receiving the optical communication medium (light reception). The optical communication medium transmitted from each of the plurality of light transmitting/receiving sections 10-1 to 10-$n$ is received by a corresponding one of a plurality of light transmitting/receiving sections 130-1 to 130-$n$ in the free space optical communication device 101, which is a communication target. Conversely, the optical communication medium transmitted from each of the plurality of light transmitting/receiving sections 130-1 to 130-$n$ in the free space optical communication device 101, which is the communication target, is received by a corresponding one of the plurality of light transmitting/receiving sections 10-1 to 10-$n$ in the free space optical communication device 1.

The optical communication medium to be transmitted/received is a directional optical communication medium. A specific example of the optical communication medium may be electromagnetic wave of a high frequency region including a frequency of not less than approximately 10 GHz. However, the present example embodiment is not limited to this. Examples of the electromagnetic wave of the frequency region encompass millimeter wave, submillimeter wave, infrared light, visible light, and ultraviolet light.

In an example, each of the light transmitting/receiving sections 10-1 to 10-$n$ emits electromagnetic wave of the frequency region in such a manner that the electromagnetic wave is directed at an angle within a given angle range.

Consequently, the electromagnetic wave is used for communication as the above-described directional optical communication medium. Here, in a specific example, in order to direct the electromagnetic wave of the above frequency region, each of the light transmitting/receiving sections 10-1 to 10-$n$ may be configured to include, for example, the followings:

A beam forming antenna that emits millimeter wave or submillimeter wave in such a manner that the millimeter wave or the submillimeter wave is directed at an angle within a given angle range;

A collimator that collimates infrared light, visible light, or ultraviolet light;

A laser oscillator that generates a laser beam of infrared light, visible light, or ultraviolet light; and/or A modulator that modulates a laser beam by changing the phase of crystal.

However, the present example embodiment is not limited to such a configuration.

When each of the light transmitting/receiving sections 10-1 to 10-$n$ emits the electromagnetic wave of the above frequency range, which is an optical communication medium, in such a manner that the electromagnetic wave is directed at a given angle, an energy density of the optical communication medium is increased. This enables communication, via the optical communication media, with a communication target at a farther location.

(Communication Control Section 20)

The communication control section 20 controls communication via the plurality of light transmitting/receiving sections 10-1 to 10-$n$. Specifically, the communication control section 20 determines a required communication capacity for the communication, and controls, on the basis of the required communication capacity, the number of light transmitting/receiving sections 10-1 to 10-$n$ to be used for the communication.

The required communication capacity can be estimated by, for example, regression analysis based on a communication capacity in previous communication (at least one selected from the group consisting of a communication traffic, a noise amount, the number of connected channels (the number of light transmitting/receiving sections having been used), and the like). The regression analysis may be carried out by the communication control section 20. Alternatively, an analysis result given by another configuration may be obtained by the communication control section 20. These pieces of data based on the previous communication are, for example, pieces of previous data obtained in the same time slot as a time slot in which the communication is to be conducted.

The communication control section 20 controls, on the basis of the required communication capacity, the number of light transmitting/receiving sections 10-1 to 10-$n$ to be used for the communication. The communication control section 20 may obtain the estimation of the required communication capacity continuously or periodically. The communication control section 20 determines, with use of a table and/or the like associated with communication capacities, the number of light transmitting/receiving sections 10-1 to 10-$n$ to be used for the communication.

The communication control section 20 transmits/receives the optical communication media with use of determined one(s) of the light transmitting/receiving sections 10-1 to 10-n.

The light transmitting/receiving sections 10-1 to 10-n may employ respective different communication schemes. Alternatively, two or more (e.g., light transmitting/receiving sections 10-1 and 10-2) of the light transmitting/receiving sections 10-1 to 10-n may employ the same communication scheme and the other one(s) may employ a communication scheme(s) different from that of the light transmitting/receiving sections 10-1 and 10-2. In this case, the communication control section 20 may control, on the basis of the required communication capacity, the number of light transmitting/receiving sections to be used for the communication, among the light transmitting/receiving sections employing the same communication scheme.

Alternatively, the light transmitting/receiving sections 10-1 to 10-n may carry out communication at respective different wavelengths. Alternatively, two or more (e.g., light transmitting/receiving sections 10-1 and 10-2) of the light transmitting/receiving sections 10-1 to 10-n may carry out communication at the same wavelength and the other one(s) may carry out communication at a wavelength(s) different from that of the light transmitting/receiving sections 10-1 and 10-2. In this case, the communication control section 20 may control, on the basis of the required communication capacity, the number of light transmitting/receiving sections to be used for the communication, among the light transmitting/receiving sections carrying out communication at the same wavelength.

As discussed above, the free space optical communication device 1 in accordance with the present example embodiment and the free space optical communication system 400, which includes the free space optical communication device 1, are each configured to include: the plurality of light transmitting/receiving sections; and the communication control section 20 that controls communication which is to be carried out via the plurality of light transmitting/receiving sections, the communication control section 20 (a) determining a required communication capacity for the communication and (b) controlling, on the basis of the required communication capacity, the number of light transmitting/receiving sections to be used for the communication. Thus, the present example embodiment can bring about, by not using a light transmitting/receiving section(s) unnecessary for communication, an effect of making it possible to save power consumption.

(Flow of Free Space Optical Communication Method)

Figure 2:
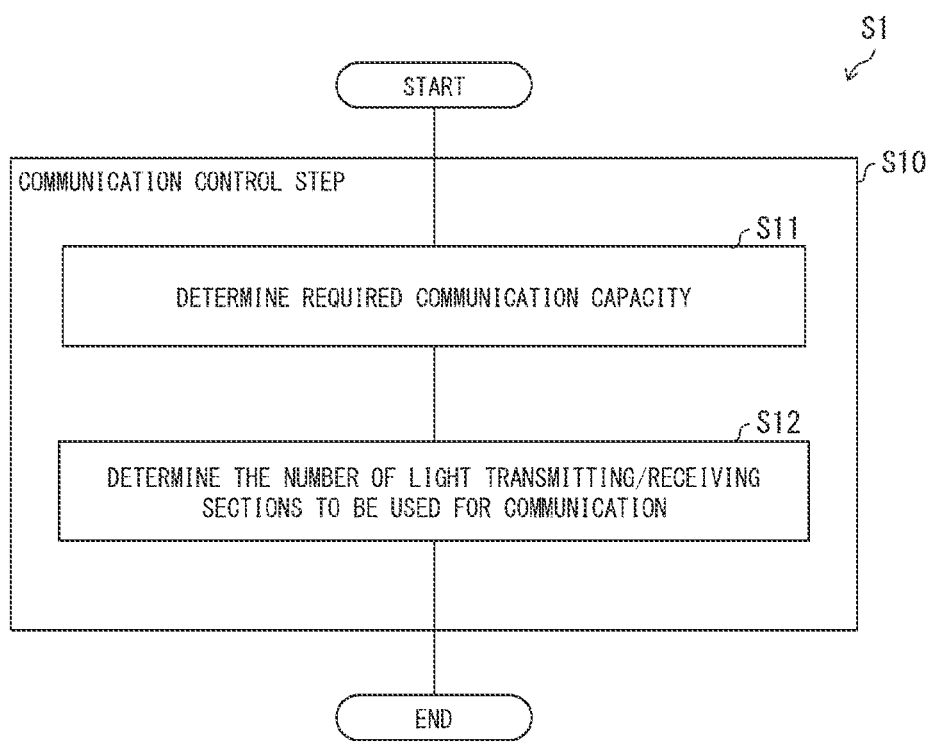
FIG. 2 is a view illustrating a process flow of a free space optical communication method in accordance with the first example embodiment of the present invention.

The following will describe, with reference to FIG. 2, a flow of a free space optical communication method S1 in accordance with the present example embodiment. FIG. 2 is a flowchart illustrating a flow of the free space optical communication method S1.

As shown in FIG. 2, the free space optical communication method S1 includes controlling communication which is to be carried out via the plurality of light transmitting/receiving sections (communication control step, step S10). This step S10 includes steps S11 and S12.

(Step S11)

In step S11, the communication control section 20 determines a required communication capacity for communication. Since the required communication capacity and the determination thereof have been discussed in detail above, descriptions thereof will be omitted here.

(Step S12)

In step S12, the communication control section 20 determines the number of light transmitting/receiving sections 10-1 to 10-n to be used for the communication, and controls one(s) of the light transmitting/receiving sections 10-1 to 10-n determined to be used so that the one(s) of the light transmitting/receiving sections 10-1 to 10-n execute a light transmitting/receiving process. Since the specific contents of this process have been discussed above, a description thereof will be omitted here.

As discussed above, the free space optical communication method S1 in accordance with the present example embodiment includes controlling (S10) communication which is to be carried out via the plurality of light transmitting/receiving sections (S10). Further, the controlling (S10) the communication includes: determining (S11) a required communication capacity for the communication; and controlling (S12), on the basis of the required communication capacity, the number of light transmitting/receiving sections to be used for the communication. The present example embodiment carries out control so as not to use a light transmitting/receiving section(s) unnecessary for communication, thereby bringing about an effect of making it possible to save power consumption.

Second Example Embodiment

The following description will discuss a second example embodiment of the present invention in detail with reference to the drawings. Note that members having identical functions to those of the first example embodiment are given identical reference signs, and a description thereof will be omitted.

(Configuration of Free Space Optical Communication System)

Figure 3:
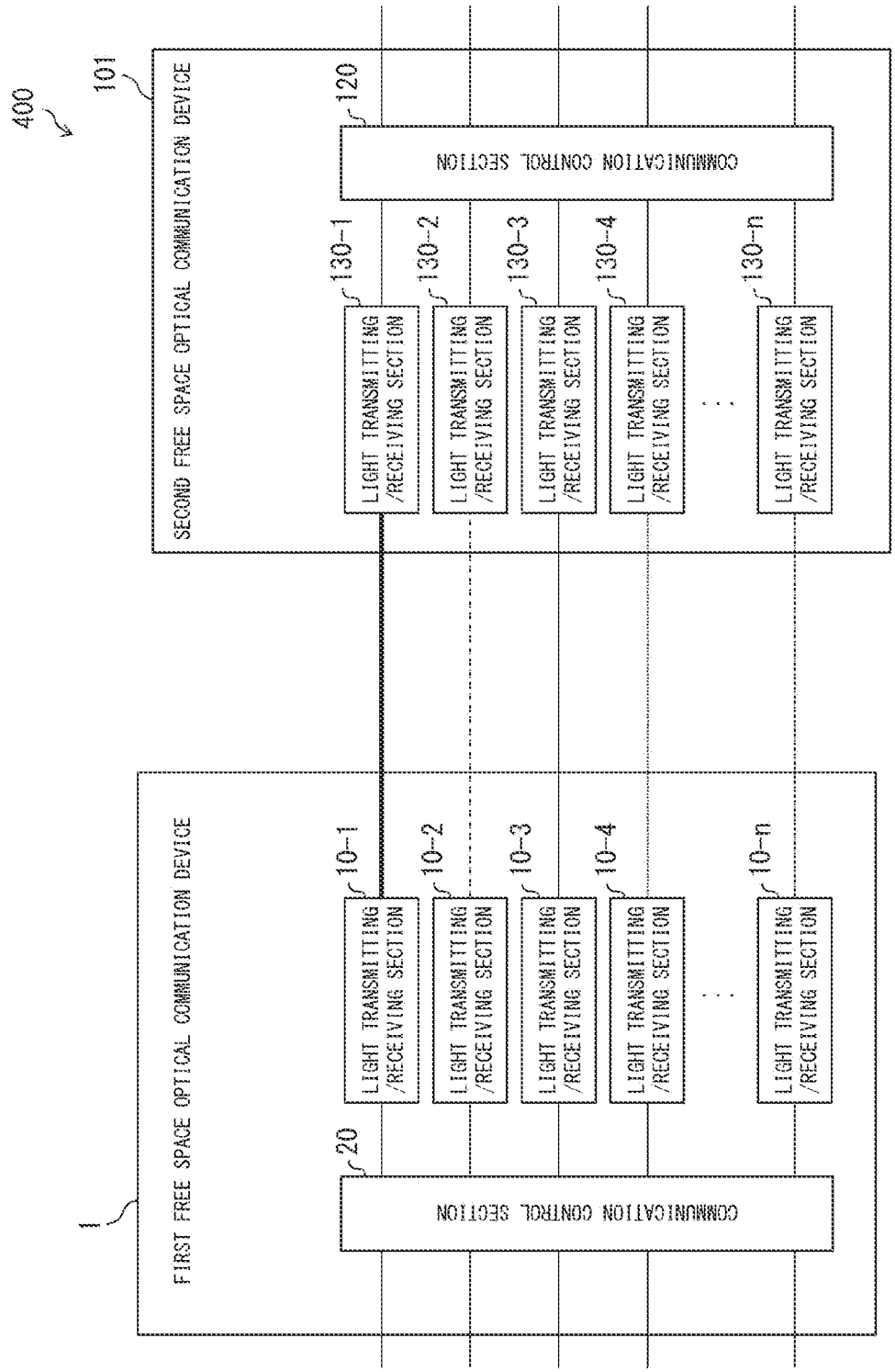
FIG. 3 is a block diagram illustrating a configuration of a free space optical communication system including a free space optical communication device in accordance with a second example embodiment of the present invention.

The following will describe, with reference to FIG. 3, a configuration of a free space optical communication system including a free space optical communication device in accordance with the present example embodiment. FIG. 3 is a block diagram illustrating a configuration of a free space optical communication system 400. The free space optical communication system 400 is a system that realizes spatial multiplex transmission and that includes a first free space optical communication device 1 including a plurality of light transmitting/receiving sections 10-1 to 10-n and a second free space optical communication device 101 including a plurality of light transmitting/receiving sections 130-1 to 130-n, which correspond to the plurality of light transmitting/receiving sections 10-1 to 10-n. FIG. 3 shows an example including first and second free space optical communication devices 1 and 101. However, the number of free space optical communication devices is not limited to this. Note that the first free space optical communication device 1 and the second free space optical communication device 101 are identical in configuration. The following discussion will be made focusing on the first free space optical communication device 1.

(First Free Space Optical Communication Device 1)

As shown in FIG. 3, the first free space optical communication device 1 in accordance with the present example embodiment includes the plurality of light transmitting/receiving sections 10-1 to 10-n and a communication control section 20. Each of the plurality of light transmitting/receiving sections 10-1 to 10-n is one implementation example of a light transmitting/receiving section recited in the claims, and the communication control section 20 is one implementation example of at least one processor recited in the claims.

(Transmitting/Receiving Sections 10-1 to 10-n)

Since an optical communication medium to be transmitted/received by each of the plurality of light transmitting/receiving sections 10-1 to 10-n is as discussed above, a description thereof will be omitted here.

Figure 4:
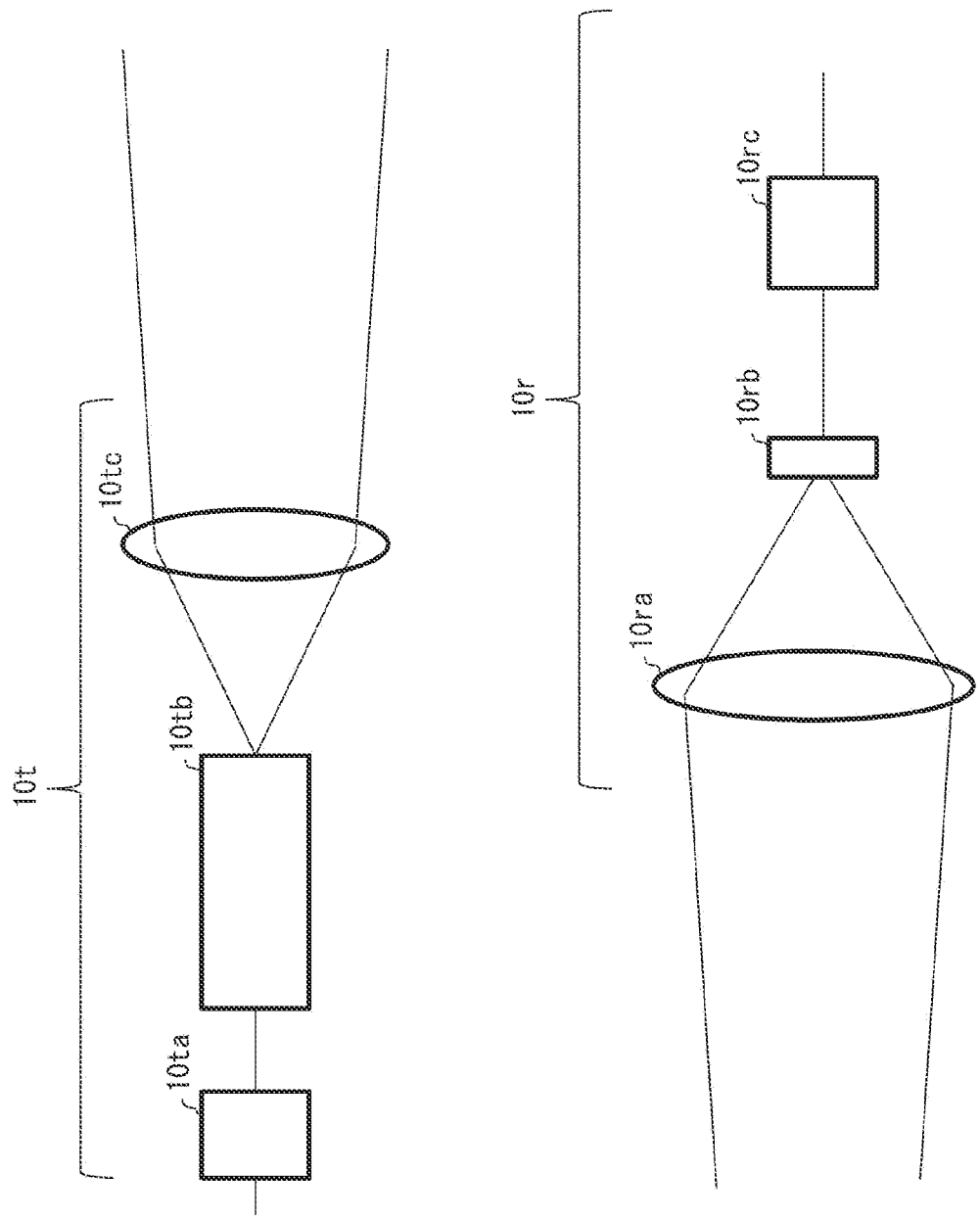
FIG. 4 is a block diagram illustrating a configuration of a light transmitting/receiving section included in a free space optical communication device in accordance with the second example embodiment of the present invention.

Each of the light transmitting/receiving sections 10-1 to 10-n can employ a known light transmitting/receiving section applicable to free space optical communication. In an example, each of the light transmitting/receiving sections 10-1 to 10-n employs a configuration shown in FIG. 4. FIG. 4 shows an example aspect in which a transmitting section 10t that transmits the optical communication medium and a receiving section 10r that receives the optical communication medium are provided separately. The transmitting section 10t is configured such that, upon reception of a signal from an electrical-optical converting section 10ta, a laser light source 10tb emits a laser beam (optical communication medium) so that the laser beam is transmitted to the outside through a collimator lens 10tc. Meanwhile, the receiving section 10r is configured such that a lens 10ra condenses the laser beam coming from the outside, a light receiving element 10rb receives the laser beam, and an electrical-optical converting section 10rc converts the laser beam into an electric signal.

(Communication Control Section 20)

The communication control section 20 shown in FIG. 3 may be the one having functions similar to those of the communication control section 20 discussed in the foregoing first example embodiment. The following description will discuss, with reference to FIG. 5, a configuration of the communication control section 20 included in the free space optical communication device 1 in accordance with the present example embodiment.

Figure 5:
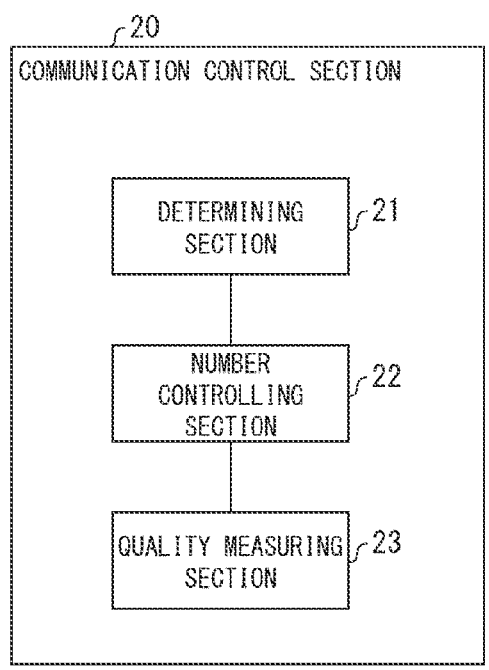
FIG. 5 is a block diagram illustrating a configuration of a communication control section included in the free space optical communication device in accordance with the second example embodiment of the present invention.

FIG. 5 is a block diagram illustrating a configuration of the communication control section 20. The communication control section 20 includes a determining section 21, a number controlling section 22, and a quality measuring section 23.

The determining section 21 determines a required communication capacity for communication which is to be carried out via the plurality of light transmitting/receiving sections 10-1 to 10-n. Since the required communication capacity and the method for estimating (determining) the required communication capacity have been discussed in the foregoing first example embodiment, descriptions thereof will be omitted here.

The number controlling section 22 controls, on the basis of the required communication capacity estimated (determined) by the determining section 21, the number of light transmitting/receiving sections 10-1 to 10-n to be used for the communication. The number controlling section 22 determines, with use of a table and/or the like associated with communication capacities, the number of light transmitting/receiving sections 10-1 to 10-n to be used for the communication. Upon determination of the number of light transmitting/receiving sections 10-1 to 10-n to be used for the communication, the number controlling section 22 uses determined one(s) of light transmitting/receiving sections 10-1 to 10-n to transmit/receive the optical communication media.

In an example, the number controlling section 22 controls the number of light transmitting/receiving sections (the number of channels) to be used, in such a manner as to allow communication of a capacity yielded by adding a margin (corresponding to a variation given by a noise or interruption) to the estimated required communication capacity. The number controlling section 22 controls, on the basis of the capacity yielded by adding the margin to the required communication capacity, the number of light transmitting/receiving sections to be used for the communication. This makes it possible to avoid a delay which may otherwise be caused by communication exceeding the required communication capacity.

In a case where the number of light transmitting/receiving sections to be used for the communication is smaller than a total number of the light transmitting/receiving sections (10-1 to 10-n), the quality measuring section 23 measures a noise or a communication quality with use of a light transmitting/receiving section(s) not to be used for the communication. Examples of the communication quality include a bit error rate, a received signal intensity, a delay, and a retransmission rate. A result of the measurement of the noise or communication quality measured by the quality measuring section 23 can be used to estimate the required communication capacity. Further, in a case where the communication quality measured by the quality measuring section 23 is poor, this result can be used to take a countermeasure against a packet loss and/or a data loss, e.g., by transmitting data through another communication path.

The second free space optical communication device 101 can be made identical in configuration to the first free space optical communication device 1. That is, the light transmitting/receiving sections 130-1 to 130-n shown in FIG. 4 can be made identical in configuration to the light transmitting/receiving sections 10-1 to 10-n, and the communication control section 120 can be made identical in configuration to the communication control section 20. Therefore, detailed descriptions thereof will be omitted.

(Effects of Free Space Optical Communication Device)

The free space optical communication devices (the first free space optical communication device 1 and the second free space optical communication device 101) in accordance with the present example embodiment and the free space optical communication system 400, which includes these free space optical communication devices, are each configured to include: the plurality of light transmitting/receiving sections; and the communication control section 20 that controls communication which is to be carried out via the plurality of light transmitting/receiving sections, the communication control section 20 (a) determining a required communication capacity for the communication and (b) controlling, on the basis of the required communication capacity, the number of light transmitting/receiving sections to be used for the communication. Thus, the present example embodiment can bring about, by not using a light transmitting/receiving section(s) unnecessary for communication, an effect of making it possible to save power consumption.

Further, the free space optical communication devices (the first free space optical communication device 1 and the second free space optical communication device 101) in accordance with the present example embodiment are each configured to measure, in a case where the number of light transmitting/receiving sections to be used for communication is smaller than a total number of the light transmitting/receiving sections (10-1 to 10-n), a noise or a communication quality with use of a light transmitting/receiving section(s) not to be used for the communication. Thus, in accordance with the present example embodiment, it is possible to effectively use the light transmitting/receiving section(s) not to be used for the communication. Further, it is possible to use the measurement result also to estimate the required communication capacity.

(Flow of Free Space Optical Communication Method)

Figure 6:
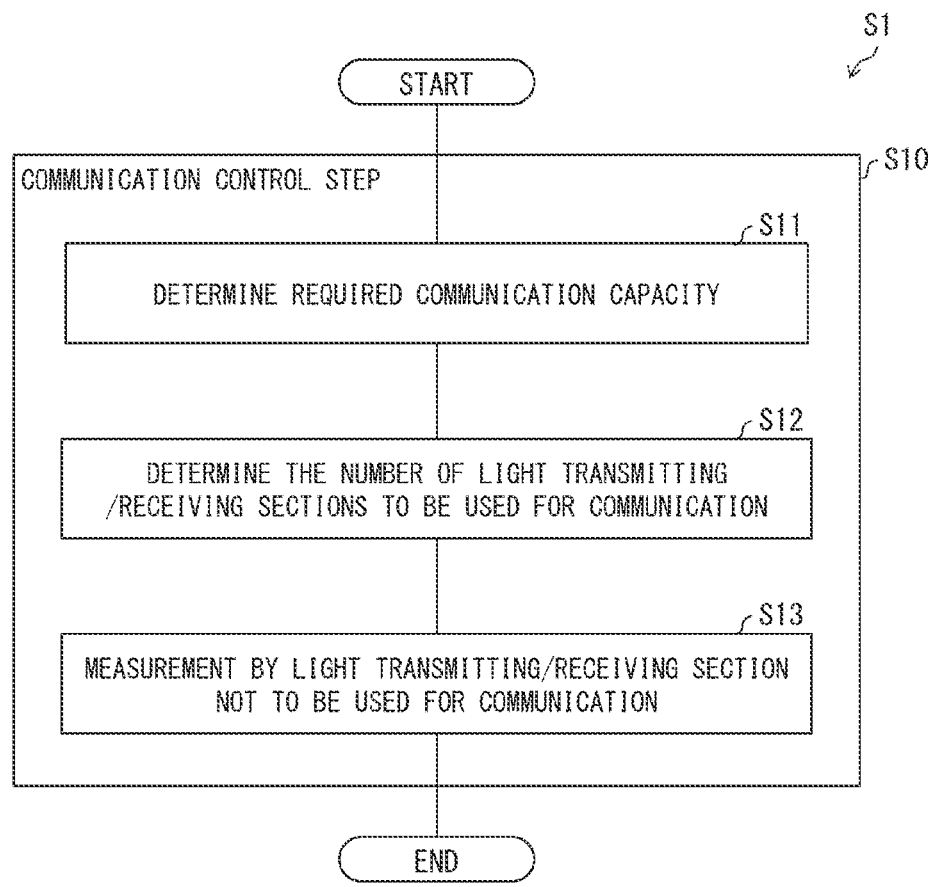
FIG. 6 is a view illustrating a process flow of a free space optical communication method in accordance with the second example embodiment of the present invention.

The following will describe, with reference to FIG. 6, a flow of a free space optical communication method S1 in accordance with the present example embodiment. FIG. 6 is a flowchart illustrating a flow of the free space optical communication method S1 to be performed by the free space optical communication system in accordance with the present example embodiment.

As shown in FIG. 6, the free space optical communication method S1 includes controlling communication which is to be carried out via the plurality of light transmitting/receiving sections (communication control step, step S10). This step S10 includes steps S11, S12, and S13.

(Step S11)

In step S11, the determining section 21 of the communication control section 20 determines a required communication capacity for communication. Since the required communication capacity and the determination thereof have been discussed above, descriptions thereof will be omitted here.

(Step S12)

In step S12, the number controlling section 22 of the communication control section 20 determines the number of light transmitting/receiving sections 10-1 to 10-$n$ to be used for the communication, and controls the light transmitting/receiving sections 10-1 to 10-$n$ determined to be used to execute a light transmitting/receiving process. Since the specific contents of the process have been discussed above, a description thereof will be omitted here.

(Step S13)

In step S13, the quality measuring section 23 of the communication control section 20 measures a noise or a communication quality on the basis of the control result obtained in step S12

As discussed above, the free space optical communication method in accordance with the present example embodiment includes: controlling communication which is to be carried out via the plurality of light transmitting/receiving sections, the controlling the communication including (a) determining a required for the communication and (b) controlling, on the basis of the required communication capacity, the number of light transmitting/receiving sections to be used for the communication. The present example embodiment carries out control so as not to use a light transmitting/receiving section(s) unnecessary for communication, thereby bringing about an effect of making it possible to save power consumption.

[Software Implementation Example]

Part of or the whole of functions of the free space optical communication devices 1 and 101 can be realized by hardware such as an integrated circuit (IC chip) or can be alternatively realized by software.

Figure 7:
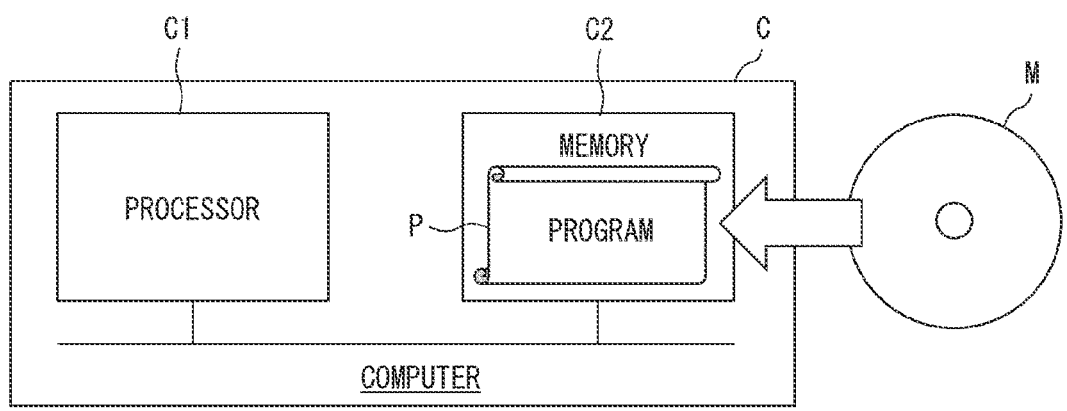
FIG. 7 is a block diagram illustrating a hardware configuration of a computer, which is one implementation example of each of the free space optical communication devices in accordance with the example embodiments of the present invention.

In the latter case, each of the free space optical communication devices 1 and 101 is realized by, for example, a computer that executes instructions of a program that is software realizing the foregoing functions. FIG. 7 shows an example of such a computer (hereinafter, referred to as a "computer C"). The computer C includes at least one processor C1 and at least one memory C2. The memory C2 has a program P stored therein, the program P causing the computer C to operate as the free space optical communication devices 1 and 101. In the computer C, the processor C1 reads and executes the program P from the memory C2, thereby realizing the functions of the free space optical communication devices 1 and 101.

The processor C1 may be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination of any of them. The memory C2 may be, for example, a flash memory, hard disk drive (HDD), solid state drive (SSD), or a combination of any of them.

The computer C may further include a random access memory (RAM) in which the program P is loaded when executed and various data is temporarily stored. In addition, the computer C may further include a communication interface via which the computer C transmits/receives data to/from another device. The computer C may further include an input-output interface via which the computer C is connected to an input-output device such as a keyboard, a mouse, a display, and/or a printer.

The program P can be stored in a non-transitory, tangible storage medium M capable of being read by the computer C. Examples of the storage medium M encompass a tape, a disk, a card, a memory, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

[Supplementary Note 1]

The present invention is not limited to the example embodiments, but can be altered by a skilled person in the art within the scope of the claims. The present invention also encompasses, in its technical scope, any embodiment derived by combining technical means disclosed in differing embodiments.

[Supplementary Note 2]

Some or all of the above example embodiments can be described as below. Note, however, that the present invention is not limited to example aspects described below.

(Supplementary Remarks 1)

A free space optical communication device including:
a plurality of light transmitting/receiving means; and
a communication control means that controls communication which is to be carried out via the plurality of light transmitting/receiving means,
the communication control means (a) determining a required communication capacity for the communication and (b) controlling, on a basis of the required communication capacity, the number of light transmitting/receiving means to be used for the communication.

The above configuration carries out control so as not to use a light transmitting/receiving section(s) unnecessary for communication, thereby making it possible to save power consumption.

(Supplementary Remarks 2)

The free space optical communication device described in Supplementary Remarks 1, wherein:
the communication control means determines the required communication capacity on a basis of a communication capacity in previous communication.

(Supplementary Remarks 3)

The free space optical communication device described in Supplementary Remarks 1, wherein:
in a case where the number of light transmitting/receiving means to be used for the communication is smaller than a total number of the light transmitting/receiving means, the communication control means measures a noise or a communication quality with use of, among the plurality of light transmitting/receiving means, a light transmitting/receiving means not to be used for the communication.

With the above configuration, it is possible to effectively use the light transmitting/receiving section(s) not to be used for the communication. Further, it is possible to use the measurement result also to estimate the required communication capacity.

(Supplementary Remarks 4)

A free space optical communication system including:
a plurality of free space optical communication devices,
at least two or more of the plurality of free space optical communication devices each including:
  a plurality of light transmitting/receiving means; and
  a communication control means that controls communication which is to be carried out via the plurality of light transmitting/receiving means,
  the communication control means (a) determining a required communication capacity for the communication and (b) controlling, on a basis of the required communication capacity, the number of light transmitting/receiving means to be used for the communication.

The above configuration carries out control so as not to use a light transmitting/receiving section(s) unnecessary for communication, thereby making it possible to save power consumption.

(Supplementary Remarks 5)

A free space optical communication method including:
controlling communication which is to be carried out via a plurality of light transmitting/receiving means,
the controlling the communication including:
  determining a required communication capacity for the communication; and
  controlling, on a basis of the required communication capacity, the number of light transmitting/receiving means to be used for the communication.

The above configuration carries out control so as not to use a light transmitting/receiving section(s) unnecessary for communication, thereby making it possible to save power consumption.

(Supplementary Remarks 6)

A program causing a computer to operate as a free space optical communication device described in any one of Supplementary Remarks 1 to 4, the program causing the computer to function as each of the means.

(Supplementary Remarks 7)

A free space optical communication device including at least one processor configured to execute:
  a communication process of carrying out communication via a plurality of light transmitting/receiving means; and
  a communication control process of controlling the communication,
  the communication control process (a) determining a required communication capacity for the communication and (b) controlling, on a basis of the required communication capacity, the number of light transmitting/receiving means to be used for the communication.

Note that the free space optical communication device may further include a memory. In the memory, a program causing the processor to execute each of the processes may be stored. The program may be stored in a non-transitory, tangible, computer-readable storage medium capable of being read by a computer.

REFERENCE SIGNS LIST

1: first free space optical communication device
101: second free space optical communication device
10, 130, 10-1 to 10-$n$, 130-1 to 130-$n$: light transmitting/receiving section (light transmitting/receiving means)
20, 120: communication control section (communication control means)
21: determining section
22: number controlling section
23: quality measuring section
400: free space optical communication system

The invention claimed is:

1. A free space optical communication device comprising:
a plurality of light transmitting/receiving sections; and
at least one processor configured to execute:
  a communication control process of controlling communication which is to be carried out via the plurality of light transmitting/receiving sections,
  in the communication control process, the at least one processor (a) determining a required communication capacity for the communication and (b) controlling, on a basis of the required communication capacity, the number of light transmitting/receiving sections to be used for the communication.

2. The free space optical communication device according to claim 1, wherein:
in the communication control process, the at least one processor determines the required communication capacity on a basis of a communication capacity in previous communication.

3. The free space optical communication device according to claim 1, wherein:
in the communication control process, in a case where the number of light transmitting/receiving sections to be used for the communication is smaller than a total number of the light transmitting/receiving sections, the at least one processor measures a noise or a communication quality with use of, among the plurality of light transmitting/receiving sections, a light transmitting/receiving section not to be used for the communication.

4. A free space optical communication system comprising:
a plurality of free space optical communication devices,
at least two or more of the plurality of free space optical communication devices each including:
  a plurality of light transmitting/receiving sections; and
  at least one processor configured to execute:
    a communication control process of controlling communication which is to be carried out via the plurality of light transmitting/receiving sections,
    in the communication control process, the at least one processor (a) determining a required communication capacity for the communication and (b) controlling, on a basis of the required communication capacity, the number of light transmitting/receiving sections to be used for the communication.

5. The free space optical communication system according to claim 4, wherein:
in the communication control process, the at least one processor determines the required communication capacity on a basis of a communication capacity in previous communication.

6. The free space optical communication system according to claim 4, wherein:
in the communication control process, in a case where the number of light transmitting/receiving sections to be used for the communication is smaller than a total number of the light transmitting/receiving sections, the at least one processor measures a noise or a communication quality with use of, among the plurality of light transmitting/receiving sections, a light transmitting/receiving section not to be used for the communication.

7. A free space optical communication method comprising:
controlling communication which is to be carried out via a plurality of light transmitting/receiving sections,
the controlling the communication including:
determining a required communication capacity for the communication; and
controlling, on a basis of the required communication capacity, the number of light transmitting/receiving sections to be used for the communication.

8. The free space optical communication method according to claim 7, wherein:
the controlling the communication includes determining the required communication capacity on a basis of a communication capacity in previous communication.

9. The free space optical communication method according to claim 7, wherein:
the controlling the communication includes measuring, in a case where the number of light transmitting/receiving sections to be used for the communication is smaller than a total number of the light transmitting/receiving sections, a noise or a communication quality with use of, among the plurality of light transmitting/receiving sections, a light transmitting/receiving section not to be used for the communication.

* * * * *